United States Patent [19]

Merakos et al.

[11] Patent Number: 5,521,925
[45] Date of Patent: May 28, 1996

[54] METHOD AND APPARATUS FOR PROVIDING MIXED VOICE AND DATA COMMUNICATION IN A TIME DIVISION MULTIPLE ACCESS RADIO COMMUNICATION SYSTEM

[75] Inventors: Lazaros Merakos, Arlington, Mass.; Shrirang Jangi, Germantown, Md.; Fayu Li, Waltham, Mass.

[73] Assignee: Hughes Aircraft Company, Los Angeles, Calif.

[21] Appl. No.: 118,709

[22] Filed: Sep. 9, 1993

[51] Int. Cl.$^6$ ........................................................ H04J 3/16
[52] U.S. Cl. ......................... 370/95.3; 379/63; 455/34.1; 455/54.2; 375/202
[58] Field of Search ...................... 370/94.1, 95.1–95.3, 370/79, 80, 81, 85.8, 85.6, 85.7; 340/825.08; 379/63; 455/34.1, 54.2; 375/202

[56] References Cited

U.S. PATENT DOCUMENTS

| | | | |
|---|---|---|---|
| 4,528,659 | 7/1985 | Jones, Jr. ........................ | 370/80 |
| 4,646,294 | 2/1987 | Eliscu et al. .................... | 370/60 |
| 4,736,371 | 4/1988 | Tejima et al. ................... | 370/95.1 |
| 5,008,883 | 4/1991 | Eizenhofer et al. ............. | 370/95.1 |
| 5,103,445 | 4/1992 | Ostlund .......................... | 370/95.2 |
| 5,121,385 | 6/1992 | Tominaga et al. .............. | 370/80 |
| 5,200,956 | 4/1993 | Pudney et al. .................. | 370/95.3 |
| 5,299,198 | 3/1994 | Kay et al. ....................... | 370/95.3 |

*Primary Examiner*—Benedict V. Safourek
*Assistant Examiner*—Ajit Patel
*Attorney, Agent, or Firm*—Gordon R. Lindeen, III; Wanda K. Denson-Low

[57] ABSTRACT

A system is described which integrates terminal traffic in a digital voice cellular radio communication system. Data is conveyed from remote data stations and remote radio telephone stations over a reverse channel TDMA frame. The allocation of time slots in the reverse channel TDMA frame is controlled at the base station. The base station provides priority to radio telephones having digitized voice traffic. The base station assigns time slots within the reverse channel TDMA frame based upon allocation requests received from radio telephone stations and remote data stations. Remote data stations may contend on a random access for a minority of a set of time slots in the reverse channel data frame. Additionally, they may request an assigned slot by inserting an allocation request in a control slot of the reverse channel data frame. The base station allocates time slots on a voice radio telephone priority, and assigns any excess time slots to data stations waiting for access to the reverse channel.

24 Claims, 7 Drawing Sheets

VS: SLOTS OCCUPIED BY VOICE STATION
DS: SLOTS OCCUPIED BY DATA STATION
CS: CONTROL SLOTS
IS: IDLE SLOTS

|  | SLOT 1 | SLOT 2 | SLOT 3 | SLOT 4 | SLOT 5 | SLOT 6 |
|---|---|---|---|---|---|---|
| F1 | RR RA RA 1 1 2 3 | C₁ C₂ C₃ C₄ RA RR RA 4 5 2 6 | DATA | DATA | DATA | DATA |
| F2 | DATA | DATA | RR RA RA RA 3 7 8 9 | DATA | DATA | DATA |
| F3 | DATA | DATA | DATA | RA RR RA 11 4 12 | DATA | DATA |
| F4 | DATA | DATA | DATA | RA 10 | DATA | DATA |
| F5 | DATA | RANDOM | DATA | RANDOM | RR RA RA RA 5 13 14 15 | DATA |
| F6 | DATA | DATA | DATA | DATA | DATA | C₅ C₆ C₇ C₈ RA RA RR RA 16 17 6 18 |

FIG. 3.

FRAME 1

FRAME 2

FRAME 3

FRAME 4

FIG. 8.

| | SLOT 1 | SLOT 2 | SLOT 3 | SLOT 4 | SLOT 5 | SLOT 6 |
|---|---|---|---|---|---|---|
| F1 | RR RA RA RA | C1 C2 C3 C4 | | | | |
| F2 | | RA RA RR RA | | | | |
| F3 | | | RR RA RA RA | VOICE | RANDOM | VOICE 3 |
| F4 | VOICE 1 | RANDOM | | RA RA RR RA | | C5 C6 C7 C8 |
| F5 | | DATA 1 | | | RR RA RA RA | RA RA RA RA |
| F6 | | | | RANDOM | | |

V4 VOICE 4
D2
V5

FIG. 9.

| | SLOT 1 | SLOT 2 | SLOT 3 | SLOT 4 | SLOT 5 | SLOT 6 |
|---|---|---|---|---|---|---|
| F1 | | C9 C10 C11 C12 | VOICE 5 | | | |
| F2 | | | | | RANDOM | |
| F3 | VOICE 1 | | VOICE 4 | DATA 2 | | C13 C14 C15 C16 |
| F4 | | DATA 1 | | | | |
| F5 | | | | RANDOM | | |
| F6 | | | DATA 6 | | | |

D5 XMITS
D3 D9 COLLISION

FIG. 10.

| | SLOT 1 | SLOT 2 | SLOT 3 | SLOT 4 | SLOT 5 | SLOT 6 |
|---|---|---|---|---|---|---|
| F1 | | C1 C2 C3 C4 | VOICE 5 | | RANDOM | |
| F2 | | | | | | VOICE 3 |
| F3 | VOICE 1 | RANDOM | VOICE 4 | DATA 2 | DATA 5 | C5 C6 C7 C8 |
| F4 | | DATA 1 | | | | |
| F5 | | | | | | |
| F6 | | | DATA 6 | RANDOM | | |

METHOD AND APPARATUS FOR PROVIDING MIXED VOICE AND DATA COMMUNICATION IN A TIME DIVISION MULTIPLE ACCESS RADIO COMMUNICATION SYSTEM

RELATED APPLICATIONS

"Method and Apparatus for Exploitation of Voice Inactivity to Increase the Capacity of a Time Division Multiple Access Radio Communication System" Ser. No 622,232, filed Dec. 6, 1990, issued as U.S. Pat. No. 5,299,198 on Mar. 29, 1994, and "Multiple Diversity Aloha Access" Ser. No. 622,243, filed Dec. 6, 1990 now abandoned. The disclosures of both of these documents are hereby incorporated by reference herein.

TECHNICAL FIELD

The invention relates to the mobile radio telecommunication art. Specifically, a system is provided which will integrate data terminal communications in a cellular telephone communication system.

BACKGROUND ART

Radio telecommunications service is presently provided on a cellular basis to mobile telephones which communicate to a base station within each cellular area. A North American TDMA digital cellular network standard IS54 has been proposed, which is primarily intended to carry digitized voice traffic instead of analog voice traffic between the mobile radio telephone stations and the base stations. The standard seeks to conserve the scarce resource of radio bandwidth in the cellular networks by transmitting telephone speech as digitized voice packets in the time slots of a TDMA time frame. The new proposed IS54 standard will provide for a 3:1 capacity gain over the current conventional Amps standard, which is documented in the TIA Standard IS54. The Amps-D and IS54 terminology refers to the same air radio interface.

The technique described in the foregoing patent application "Method and Apparatus for Exploitation of Voice Inactivity to Increase the Capacity of a Time Division Multiple Access Radio Communication System" will avoid allocating bandwidth to the pauses which occur in speech. The system referred to herein as the E-TDMA® allots bandwidth to accommodate each speech burst. Each time a speech burst occurs, a request to allocate a time slot is generated and a time slot in the reverse data frame is assigned for carrying the digitized speech burst.

To implement the foregoing protocol of assigning time slots to mobile stations when a digitized speech burst is created, the protocol envisions a time division multiplex access system having a forward TDMA frame from the base station to each of the mobile stations and a reverse TDMA frame of data packets from the mobile stations to the base station. The time slots of the reverse TDMA frame are assigned by the base station as allocation requests are received from each mobile station which has created a digitized voice packet to transmit. Thus, the idle time represented by a speech pause does not receive any allocated bandwidth which would go unused.

The system described in the aforementioned co-pending patent application provides a base station which manages a pool of transmission channels comprising a plurality of different carrier frequencies, each of which are modulated with forward and reverse TDMA frames. The base station will manage the incoming data packets received from the PSTN as well as make the dynamic, on the fly reverse frame data slot assignments to each mobile station having a speech packet to transmit.

The assignment of time slots in the reverse data frame results when a mobile station having a data packet issues a channel allocation request in a control slot of the reverse TDMA frame. The base station, once obtaining the allocation request, will identify an available time slot within the subsequent reverse data frame, and communicate the identity of that time slot to the requesting mobile in the forward data frame. The requesting mobile station can then transmit the digitized voice packet in the allotted time slot.

In order to preserve the speech quality, the packet assignment must not incur any significant delay such that the time between the transmission of voice packets is delayed, indicating pauses of a greater length than that which were actually produced in the original speech. The system must have an adequate number of time slots to service both very light traffic from the mobile to the base station, as well as very heavy traffic.

In the foregoing North American TDMA Digital Cellular Network Standard IS54, there is also a proposal to incorporate a data mode such that a mobile or remote data terminal can use any available time slots in the reverse frame.

The introduction of data traffic in an essentially voice telecommunications system requires a protocol which will take into account the needs of both services. Data packets originating from a data terminal are not as time-sensitive to delays as are speech packets. Thus, it is possible to provide a lesser priority to data station data packets than voice station data packets.

Further, in order to have a system of mixed digital voice packet transmission and digital data transmission, the system must be adaptable to different traffic loads on the network. As channel traffic increases, the system must equitably distribute bandwidth to contending data stations, while still maintaining enough bandwidth for the higher priority voice stations to preserve the voice quality.

SUMMARY OF THE INVENTION

It is an object of this invention to provide for a system of radio communication in which digital voice as well as digital data may alternately use the same channel bandwidth.

It is a more specific object of this invention to provide for a protocol for remote data terminals to communicate over a TDMA digital cellular telephone network.

It is also a specific object of this invention to provide a remote data communication facility which utilizes available time slots in an extended time division multiple access voice communication system for carrying data terminal packets.

These and other objects of the invention are provided by a communication protocol which permits the integration of data terminal traffic in a digital voice cellular radio communication system. The data traffic conveyed from remote data stations and remote radio telephone stations to a base station is carried by the same reverse TDMA frame. The allocation of time slots for voice or data is controlled by the base station.

In order to provide priority to digitized voice traffic, the base station includes a separate allocation que for voice stations desiring a time slot in the reverse data frame and a data terminal allocation que for identifying allocation requests from data terminal stations requiring a time slot for transmitting data packets. In this way, the base station under software control will always give priority to voice traffic based on the relative contents in the voice allocation que versus the data terminal allocation que.

The protocol for permitting data stations to utilize the reverse data frame which also carries digitized voice packets is responsive to changes in the level of traffic carried by the reverse data frames. During light traffic conditions, wherein there is little voice traffic, more time slots in the reverse data frame can be assigned to carry the data terminal traffic than in high traffic conditions, when the bandwidth demands of voice traffic must take priority.

The protocol used by data stations for the transmission of data packets in the reverse channel combines three (3) basic mechanisms: (1) round-robin access to designated reverse control channel slots for sending reverse channel slot allocation requests (ALLOCREQ) to the base station; (2) random access to non-assigned reverse channel slots for the direct transmission of data packets without prior reverse channel slot assignment; and (3) a reservation process for assigning a reverse channel slot to a data station, which has successfully accessed the channel through random access.

The round-robin (RROB) mechanism is used to guarantee that a data station can send an ALLOCREQ to the base station with a delay that does not exceed one RROB cycle, which consists of C consecutive reverse frames. C is a design parameter referring to the RROB cycle length.

The RROB mechanism uses R slots, referred to as RROB slots, from the reverse pool. Each RROB slot is partitioned into M RROB subslots. The base station uniquely assigns to each data station one of the C.R.M. RROB subslots available in a RROB cycle, when the data station logs onto the cellular network. The RROB cycle length is determined by the base station so that the number of RROB subslots in a cycle exceeds by a certain small amount the number of participating data stations. When changes in the number of data stations occur, the base station may change the cycle length accordingly, and broadcast the change to the data stations in forward channel control slots.

A data station transmits an ALLOCREQ in its own RROB subslot provided that its queue is non-empty and no reverse data slot has already been assigned to it.

Data terminals may also transmit packets to the base station in available non-assigned reverse channel slots using random access. The base station will identify in control slots of each forward frame those slots which are available in the next reverse frame for random access by a data station. Thus, a data station having knowledge of those random access slots may contend with other data stations using conventional contention and retry procedures for access to one of the random access slots.

When a base station receives a data packet in a random access slot, which includes an identifier identifying which data station originated the data packet, it will send an acknowledgement in its subsequent forward frame indicating to the originating data station that the data packet was received.

In high traffic conditions, wherein collisions are occurring at a high rate between data terminal stations trying to access the same random slot, a reservation system is provided wherein each data station may request of the base station an allocation of a reverse frame time slot for transmission of a data packet. If, after a given timeout period, random access attempts have not been successful, a data station may insert in a subslot of the control slot of the reverse TDMA frame an allocation request. Each data station will have a dedicated subslot of each receive frame in which to communicate its allocation request to the base station.

The base station, upon obtaining each allocation request, indicating that a data station is requesting assignment of a data slot in the reverse frame will place the request in the appropriate allocation que. When the voice traffic allocation que is empty, slots can be assigned which are normally used to carry voice packets to the waiting data stations identified in the data station allocation que.

As an additional embodiment, a random access reservation may also be employed. In this mode, data stations that successfully contend for one of the random time slots which are available for use by the data stations may append an allocation request to its data packet. Thus, the base station, upon detecting a successful random access transmission of a data station will place an allocation request in the data allocation que, and in turn, assign a time slot to the requesting data station for use in transmitting additional packets to the base station.

The mixed protocol using both random access and the reservation system for communicating a reverse frame allocation request to the base station, permits a dynamic boundary to be established for the reverse data frame.

Thus, as the number of random available time slots in the reverse data frame becomes inadequate to carry data traffic to the base station, the base station may allocate other time slots when voice traffic is low.

The foregoing protocol always provides the necessary priority for digitized voice packets to maintain the integrity of the voice traffic, while permitting the assignment of time slots which are not needed for voice traffic to data stations.

DESCRIPTION OF THE FIGURES

FIG. 3 illustrates an example of the reverse channel data frame used by the system of FIG. 1.

FIG. 8 is an illustration of a reverse channel time frame in one scenario.

FIG. 9 is the illustration of the reverse channel time frame in a second scenario.

FIG. 10 is the illustration of a reverse channel frame in a third scenario.

DESCRIPTION OF THE PREFERRED EMBODIMENT

Figure 1:
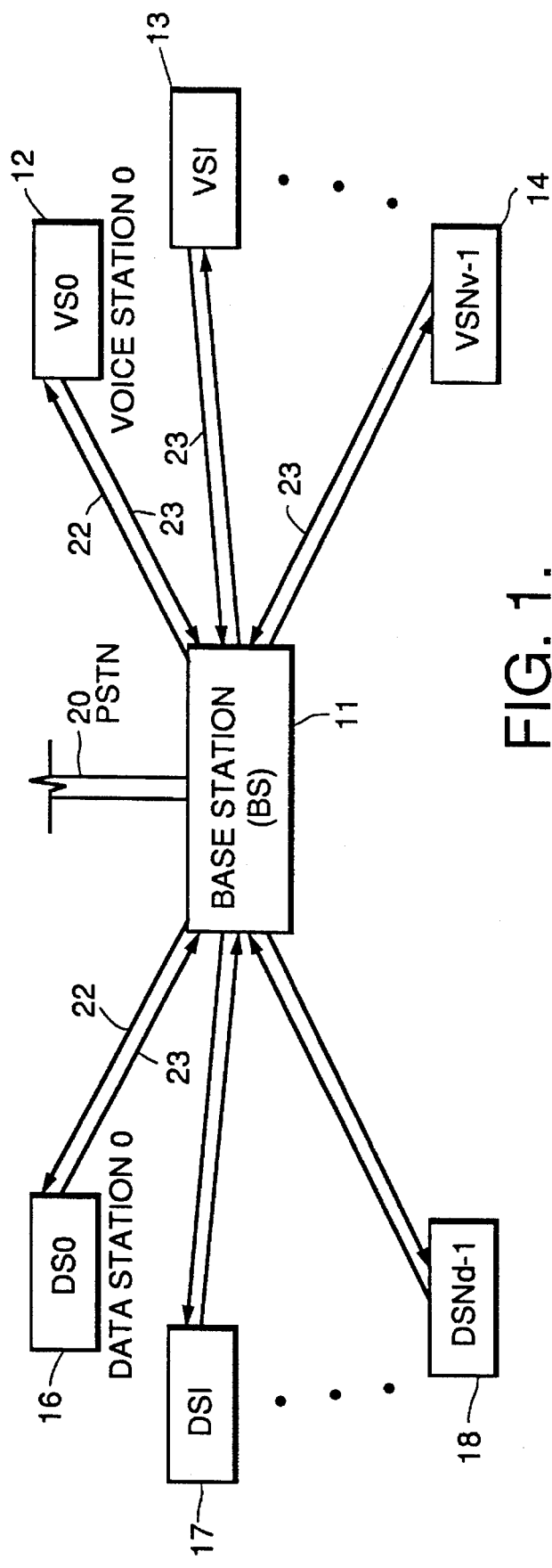
FIG. 1 illustrates a cellular radio telephone communication system which includes the capability of permitting data stations to communicate over the same channel bandwidth as is occupied by telephones.

Referring now to FIG. 1, there is shown an illustration of a mobile telephone system integrated with a remote/mobile data system. A base station 11 communicates with the voice stations 12, 13 and 14 as well as with data stations 16, 17 and 18. The mechanism for communication is a radio link from the base station which can be tuned by each of the voice stations 12–14 and data stations 16–18.

Traffic from the base station to each of the data stations 16, 17 and 18 and voice stations 12, 13 and 14 is sent as digital packets in a forward frame of time division multiplex time slots which modulate the radio link. Separated from the outgoing forward frame 23 is a reverse frame of time division multiplex time slots for carrying traffic from each of the voice stations 12–14 and data stations 16–18 to the base station 11. The base station 11 is connected to a public service telephone network (PSTN) 20.

The radio frequency carrier linking the base station 11 with each of the data stations and voice stations 12–18 employs a TDMA format, using a forward frame 22 and reverse frame 23. The forward frame 22 consists of a plurality of time slots which are divided into control slots carrying control information and data slots carrying either digitized voice or digitized digital data for either a voice station or data station.

The forward and reverse frames are separated in time and all the stations 12, 13, 14, 16, 17 and 18 are synchronized with the forward and reverse frames. The base station 11 assigns time slots in the reverse frame 23 to the data and voice stations to send packets of data back to the base station 11. The system shown in FIG. 1 can use the E-TDMA protocol as set forth in the aforesaid co-pending patent application. In this protocol, speech packets from the voice stations 12, 13 and 14 are assigned a location in the reverse data frame each time they occur by issuing a new allocate request to the base station.

Figure 2:
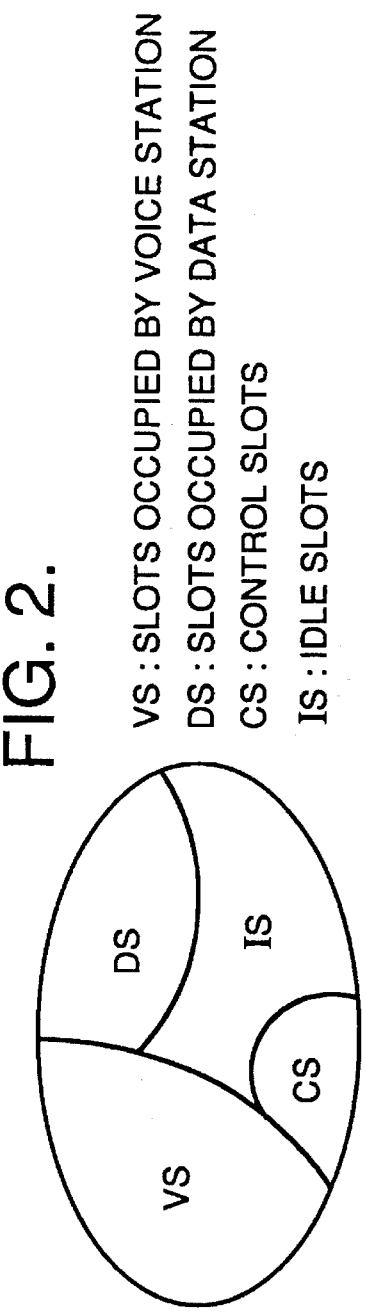
FIG. 2 shows how the time slots of the reverse channel TDMA are assigned between the different services.

FIG. 2 illustrates how the reverse frame time slots are allocated between the voice stations, data stations and control slots contained in the reverse data frame. The reverse data frame may also include some idle slots which exist in a low traffic condition.

In developing a protocol which is operable in an E-TDMA environment, the differences between voice and data communications must be appreciated. In a typical conversation, the average speech lasts approximately 1.5 seconds in duration. This is followed by pauses of typically 2.25 seconds duration, providing a 0.4 voice activity factor. E-TDMA allots bandwidth in the way of a time slot for the speech bursts only, and no time slots or bandwidth is wasted on the pauses which naturally occur.

If insufficient bandwidth is allotted to the voice traffic, voice clipping will occur, providing a disastrous effect on speech quality. However, delays between data station packet transmissions do not denigrate the quality of the data traffic in any material way. Thus, any protocol which adds to an essentially voice channel data terminal packet transmissions must not overload the system such that voice data packets suffer from delays imposed by data station traffic on the reverse channel data frame.

The base station 11 in the E-TDMA system controls the allocation of bandwidth in the way of a TDMA time slot in both the forward channel 22 and reverse channel 23. As set forth in the aforesaid co-pending patent applications, the voice stations 12, 13 and 14 initiate a request for time slot allotment in the reverse channel when the speech burst is detected and digitized. Using the contention techniques described in the aforementioned application, the base station 11 will que up each request to allocate in its voice que and assign to each requesting station a time slot based on its availability in the reverse channel 23 for transmission to the base station 11. The slot assignment is carried by each forward channel frame. Each time a packet has been transmitted from the voice station 12, 13 or 14 over its allotted time slot in the reverse channel, a deallocate is appended to the packet indicating to the base station 11 that it is free to reassign the slot to another station or the same station which subsequently generates a burst of digitized speech for transmission to the base station 11.

Integrating a remote data terminal capability with the E-TDMA voice system requires observing the protocol requirements for the voice stations, as well as insuring priority of voice traffic over data station traffic.

Interactive data terminals are not subject to the stringent requirements on delays between packets. The traffic initiated by a remote data terminal tends to have very low duty cycle, wherein a packet is produced at the speed of the user's typing capability. The data packets produced can be buffered at the data terminal and sent as bandwidth becomes available, without any serious consequences to the data service. Occasionally, file transfers occur from a remote data station to the base station, which tend to be much longer. However, even long file transfers can incur waits between packets which do not ultimately impact on the quality of the data transfer.

Given the foregoing differences between transfers from remote data terminals and packetized speech on a speech burst basis, it is clear that the voice channels must have priority to avoid the consequences of delays between speech packets.

In deciding on an appropriate protocol for carrying both remote data terminal traffic and remote voice radio telephone traffic, the protocol must be dynamic such that it can adapt to the relative changes in voice traffic and data traffic occurring from the remote locations over the reverse channel. Providing data terminals with exactly the same protocol as voice terminals would result in the deterioration of the quality of voice traffic which, as has been noted, is delay-sensitive. Since the delay sensitivity between the two services is vastly different, the system which employed the same protocol inherently results in a loss of quality for the voice traffic.

A fixed boundary approach in which certain time slots are allotted on a fixed basis to carry data traffic as well as voice traffic would result in considerable inefficiency, as it does not take into account changes in traffic level which occur with each type of traffic, voice and data. Thus, there are periods of time in which the voice traffic would be very light, and any fixed allotment of time slots for each type of service would clearly result in a number of idle slots which could not be used by data terminals attempting to transfer files over the reverse channel to the base station.

FIG. 3 illustrates the movable boundary approach implemented by the present protocol as applied to the E-TDMA reverse channel frame.

The E-TDMA forward and reverse channels use frequency hopping and shown in the Figure are six (6) frequencies and six (6) time slots, providing a total of 36 slots in the reverse data frame.

Control slots are shown for the E-DTMA reverse voice channel as including subslots RR and RA. As explained in the foregoing patent application, the RA subslots designate one of the following four message types: (1) reverse allocate request; (2) reverse deallocate request; (3) connect; and (4) release. The RR subslot, referred to as a reverse response subslot, carries the following data: (1) mobile ID message type; (2) DVCC; (3) CRC; and (4) FEC, all dedicated to the voice station protocol.

In order to implement the data station protocol to maintain compatibility with the E-TDMA voice station protocol, more control slot overhead is needed. The control slot overhead necessary to implement the data station protocol is shown as subslots C1, C2, C3 and C4, for slot 2 as well as subslots C5, C6, C7 and C8 for slot 6 of frequency 6.

The control slot overhead for the data channel protocol is provided such that allocate requests may be initiated at each of the data stations during their pre-assigned subslot. The base station, upon detecting the presence of a bit set in one of the subslots, will recognize the bit as a reverse channel allocate request for a specific data station.

FIG. 3 illustrates numerous slots of the six frames marked as DATA. These data slots carry either digitized voice packets or packets from the remote data terminals, depending on the assignment given by the base station to the various stations having data to send.

Two of the slots shown are marked as RANDOM and these two are available in this frame for random access by data stations. The position of each of the random slots available in a reverse frame is given to the remote data stations by the base station in control slots of the previous forward frame. The base station determines the location and number of random slots in each reverse frame from its knowledge of the set of reverse data slots which have not been assigned to a station yet. In reference to FIG. 3, data station terminals may contend for access to the two marked RANDOM slots by inserting their data packets in the random slot, as well as their own ID appended to the random packet. If the base station receives the data, and the data has not been subject to a collision with other data terminals attempting to use the two random slots, the base station will then acknowledge receipt of the packet.

The remaining time slots marked DATA are partitioned by the base station among the radio telephones issuing voice packets, in accordance with the format of the EDTMA system and are also available for assignment to a data terminal which have requested a slot assignment using the foregoing subslots. Thus, when the base station determines that there are an adequate number of time slots to service the radio telephone packets being initiated at the mobile radio telephones, it will assign any excess data slots to data terminals which are signalling their reverse allocate requests on the control channel subslots, C1 through C8.

By apportioning the data slots among the competing voice communication demands and data terminals demands, it is possible to preserve the bandwidth efficiency while maintaining adequate bandwidth for the time-sensitive voice communications which occur over the reverse data frame.

The foregoing protocol combines three (3) basic mechanisms for the transmission of data packets on the reverse channel: (1) round robin access to designated reverse control channel slots for sending reverse channel slot allocation requests (REVALREQ) to the base station; (2) random access to non-assigned reverse channel slots for the direct transmission of data packets without prior reverse channel slot assignment, and (3) a reservation process for assigning a reverse channel slot to a data station which has successfully accessed the channel through random access.

As shown in FIGS. 4A through 4D, the round robin mechanism, used to guarantee that a data station obtains a slot allocation, utilizes R slots of the reverse channel slot pool, referred to as RROB slots of the E-TDMA reverse channel frame. Each RROB slot is partitioned into M subslots. A round robin cycle consists of C consecutive frames, shown as frame 1, frame 2, frame 3 and frame 4, and therefore the number of RROB subslots in a RROB cycle is equal to N-CRM. N can be thought of as representing the number of locations in a conceptual ring (see FIG. 4, where R=1, M=4, C=4, N=16) and the RROB subslots per pool are thought of as RM tokens moving around the ring. Each data station is assigned to the lowest vacant location on the ring, and is synchronized to the ring when the remote data station first joins the network. Whenever a token comes to its location on the ring, the data station sends an allocate request to the base station, in the corresponding subslot if the data station que has data packets for transmission, and provided that no other user slot has been assigned to that particular data station following a previous allocation request.

The base station, upon receiving an allocation request in the particular subslot assigned to the data station, will send a slot assignment (REQASGN) or, if one is not available, the base station will use a REQALLOC ACK if the assignment cannot be made immediately. The base station will que up the request for assignment at the earliest possible time a slot is open.

Each of the data stations, having received an assignment of a slot for its packet transmission will append a deallocate request (DEALLOCREQ) to the last packet of its transmission, indicating that the base station is to deallocate the slot.

In the event either the allocation request or request assignment (REQASGN) is lost, the RROB cycle serves as a natural time out mechanism for the data station to insert its allocation request in its corresponding RROB subslot in the next RROB cycle.

Figure 5:
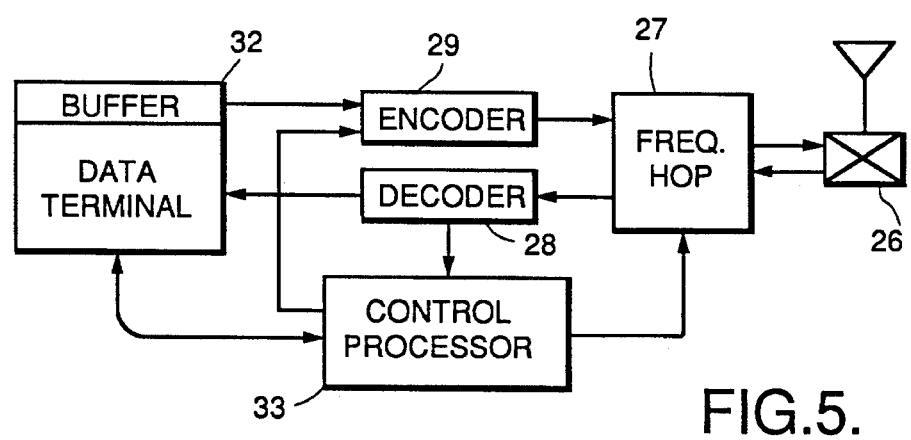
FIG. 5 is a block diagram of a remote data station which communicates over the cellular telephone communication system.

FIG. 5 is a block diagram representing the mobile/remote data terminal station which communicates via the forward and reverse data channels 22 and 23 to the base station 11 of FIG. 1. A data terminal 32 is shown which formulates packets of data, entered via a keyboard. The data terminal 32 also includes a display for displaying incoming packets of digital data, as well as a buffer for storing packets awaiting transmission.

The control processor 33 will control both the decoding of incoming frequency hopped TDMA data frames, constituting the forward frame of the forward channel 22, as well as encoding the outgoing packets from the data terminal 32, through an encoder 29. Encoder 29 inserts the outgoing data packet in its allocated time slot.

When the data terminal 32 has traffic for the reverse channel 23, a command is sent to the control processor 33 to either seize one of the random slots available in the reverse channel TDMA time frame, or to insert an allocate request in one of the dedicated subslots of FIG. 3. The frequency hopping circuitry 27 provides for decoding of the forward channel frequency hopped TDMA frame, as well as selects the frequency for transmitting the data packets from encoder 29. A diplexer 26 is shown which permits the sequential reception of the forward control frame, as well as provides for the appropriate data insertion in the reverse time frame. A common antenna 25 is shown for receiving the forward channel TDMA frame, and inserting data in the reverse channel TDMA data frame.

Figure 4:
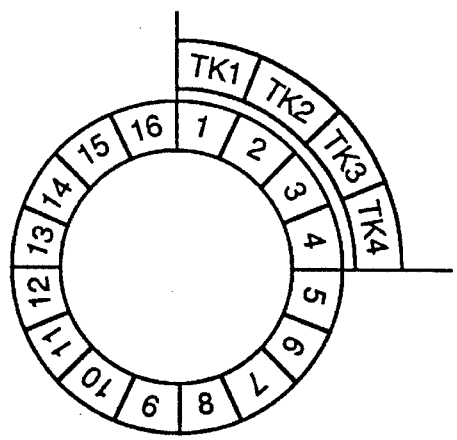
FIGS. 4a–4d illustrates the reverse channel control slots which are partitioned into subslots for carrying allocation requests from data stations.
Figure 4:
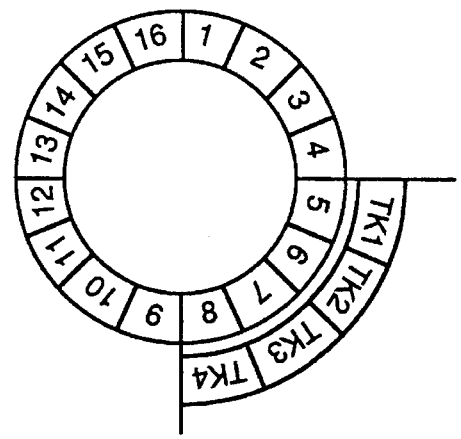
Figure 4:
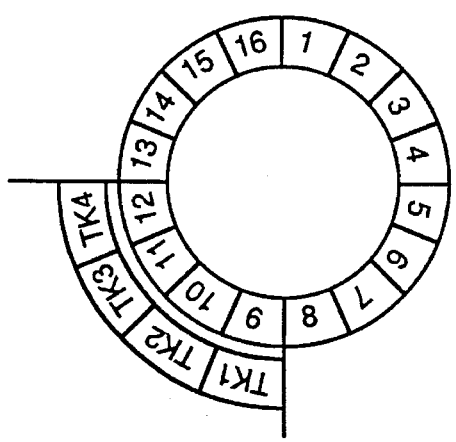
Figure 4:
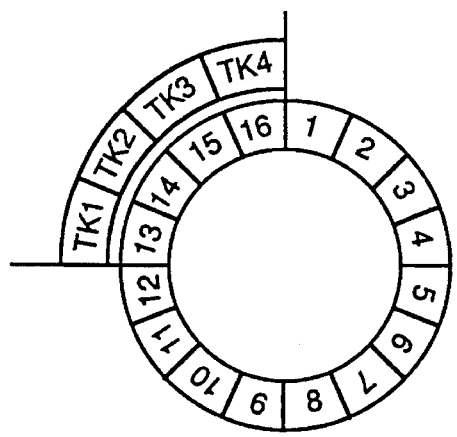
Figure 6:
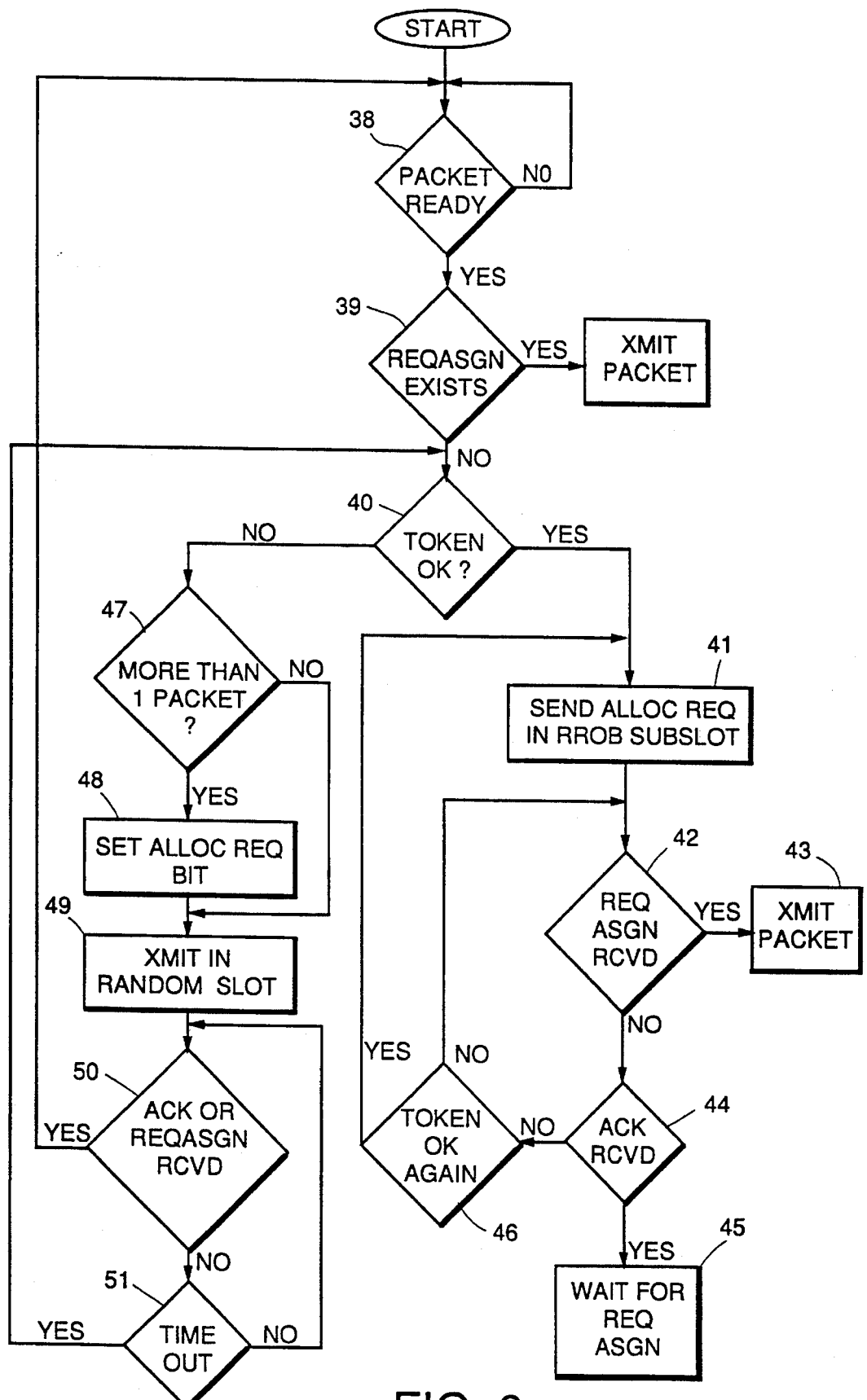
FIG. 6 is an illustration of the steps executed by the remote data terminal station in acquiring reverse channel bandwidth.

The transmission of data in the reverse channel TDMA frame occurs in accordance with the protocol of FIG. 6, which is best understood in conjunction with FIGS. 3 and 4. When the packet is determined to be ready in step 38 of FIG. 6, the packet is transmitted in the data slot assigned to the data station if the station already has a slot assigned to it, as determined in 39. If the data station does not have a slot assigned to it, it will attempt to transmit the packet using the round robin mechanism or the random access mechanism. In the event that the token position representing the station's RROB subslot occurs in the current reverse frame, in step 40, the data station will send an allocation request in 41 in the corresponding RROB subslot.

If the base station obtains the allocation request, it will subsequently issue, in the forward control channel, addressed to the particular data station issuing the allocation request, a time slot available for use by the data station. The data station, upon detecting the addressed allocation grant in 42, will transmit its data packet in the slot authorized (step 43).

In the event that no time slot is available for assignment to the data station, an acknowledgement will be transmitted (step 44). The acknowledgement will be addressed to the requesting data terminal, and the data terminal will be told to wait for an assignment of a data slot as it becomes available to the base station (step 45). As this slot becomes available for assignment, the base station will send the assignment addressed to the requesting data station over the forward channel TDMA frame.

In the event an acknowledgement has not been received in 44, the data station will attempt a retry of the allocation request, using the indicated subslot of the control slot of the reverse channel TDMA frame (step 46).

If in 40 the token is not in the data station's position, the station will attempt to transmit the packet using random access. If the station has more than one packet in its queue (as determined in 47), it will append a slot allocation request in its first packet (by setting an ALLOCREQ bit in the packet's header in step 48), and will transmit this first packet in one of the random access slots available in the current frame. The transmission of the data packet may produce a collision with another packet generated by another data station also trying to utilize the same random slot. An acknowledgement will be sent by the base station when it successfully receives a packet transmitted in the random slot (step 50). Each transmitted data packet from the data station will also include a station ID to permit the base station to determine from which data terminal the packet came. An acknowledgement will be sent in the forward channel time frame addressed to the remote data station, indicating that the data packet was received. If the received packet the ALLOCREQ bit had been set in 48, the base station will send to the data station a REQASGN if a reverse data slot is available. If such a slot is not available, the base station will send an acknowledgement.

If an acknowledgement or a REQASGN has not been received by a given time out period in 51, the data terminal will retry transmitting the packet either through random access or round robin access as determined in 40.

Figure 7:
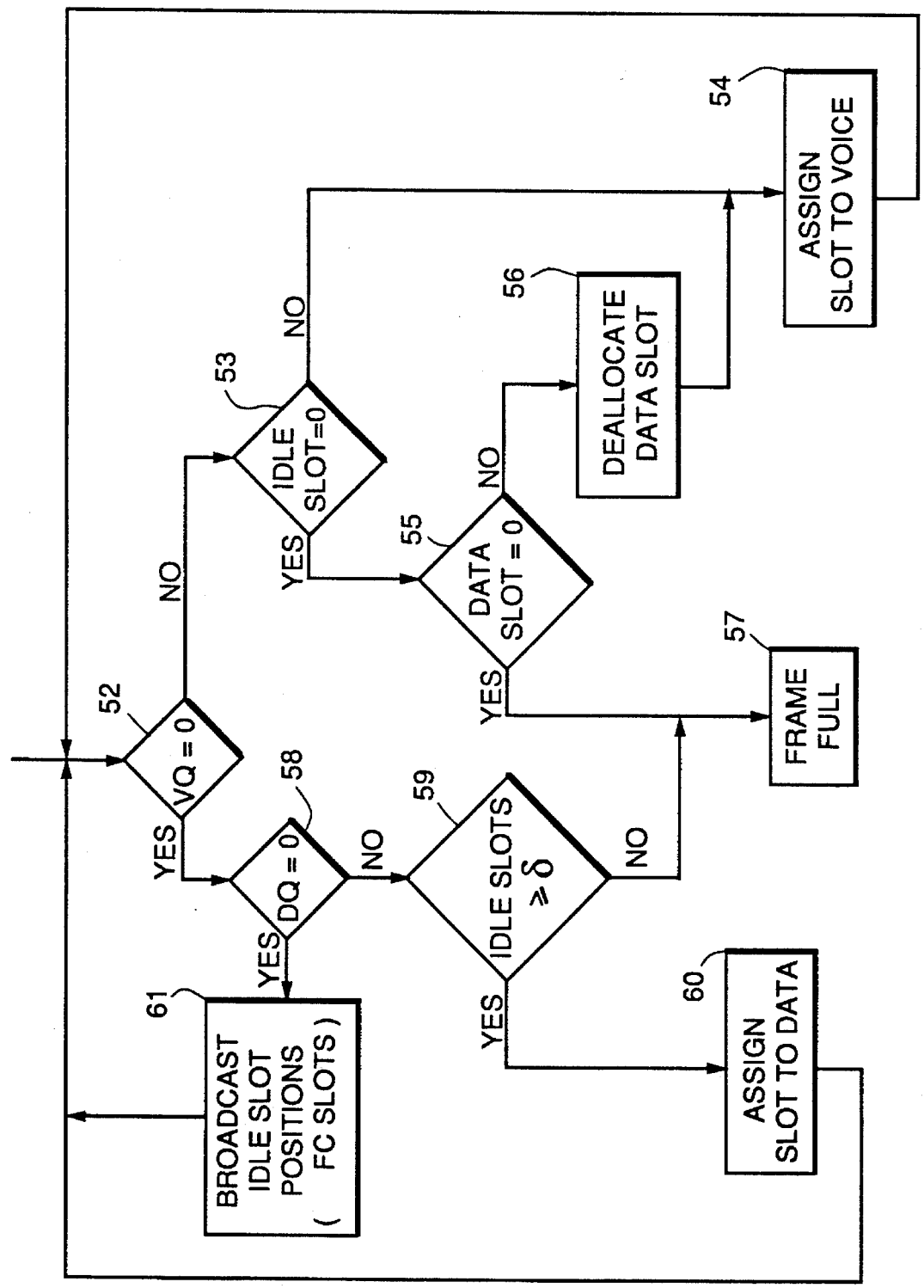
FIG. 7 is a flow chart illustrating how the base station if FIG. 1 allocates reverse channel bandwidth between data stations and voice stations.

Referring now to FIG. 7, there is shown a flow chart which illustrates how the base station allocates time slots to the requesting voice stations, as well as data stations, providing priority for the voice traffic due to the delay sensitivity. Two allocation ques are associated with the base station, a voice allocation que and a data allocation que. As requests are received in the reverse frame, in accordance with the E-TDMA format for voice channel assignment, and for data packet assignment from a data station, in accordance with FIG. 6, each of these requests are stored in a voice request que or a data request que. When the voice que has data in 52, the base station determines which time slots of FIG. 3 are available for data transfer in step 53. If idle slots are available, then the slots are assigned in step 54 to a requesting voice station in need of reverse channel bandwidth. The slots are allocated in step 54 by sending in the forward channel TDMA frame the slot identity addressed to a requesting voice station. At this time, the voice que is again checked to see whether there are any pending requests for bandwidth in the reverse channel. In the event there are no idle slots for assignment, the base station will deallocate a slot assigned to a data station in 56 and assign the slot to the requesting voice station. If there are no slots assigned to data stations in 55, the reverse channel frame is deemed to be full in 57.

New channels become available as a DEALLOCATE command is received appended to each voice or data terminal packet in the reverse channel TDMA frame. At this time, the base station will state its pool of available time slots for assignment.

In the event there are no waiting voice stations in need of bandwidth, the voice request que contents will be zero, and any idle time slots can be assigned to the requesting data terminals. The contents of the data terminal que is checked in 58, and if it does not equal zero, a check is made in step 59 to determine whether there are sufficient idle slots available to assign to requesting data stations. In accordance with the preferred embodiment, a certain number of idle slots will be kept in reserve for voice channel use, in the event there is a sudden increase in activity in voice traffic.

Assuming that there are enough idle slots available to insure immediate assignment to a requesting voice station, the excess idle slots can be assigned in step 60 to any data station having an allocate request in the data que of the base station.

If in 58 the data request que is empty, the base station will broadcast in available control slots of the current forward frame the identity of idle slots that will be available to data stations for random access in the next reverse frame (step 61).

Each of the request ques operates on a first in, first out discipline such that the earlier requests are handled first.

The forward channel is under complete control of the base station, since it knows the relative data traffic it has for the various voice stations and data terminal stations in the cellular system. Hence, a higher degree of freedom is provided to the base station for making assignment of the bandwidth of the forward frame, based on the current traffic demands from the PSTN.

FIGS. 8, 9 and 10 show three different scenarios which occur in subsequent reverse channel frames. FIG. 8 represents the I-1 frame comprising six time slots in each of six frequencies. The entire frame then comprises 36 potential slots for control and data carrying service.

The scenario illustrated in FIG. 8 comprises light slots dedicated to control. Slot 1, frequency 1 and slot 6, frequency 6 are used in the standard E-TDMA control and protocol function for permitting voice stations having packets to transmit an opportunity to contend for assignment of a time slot in the reverse data frame. Additionally, two control slots, shown as slot 2 of frequency 1, and slot 6 of frequency 5, are employed as part of the data station protocol for permitting the data stations to issue an allocate request to the base station, indicating a particular data station has data in its buffer for transmission to the base station.

The scenario represented by FIG. 8 illustrates radio telephone voice packets in slot 1, frequency 4, slot 4, frequency 2, slot 6, frequency 3. Additionally, data is being transmitted from a data station in slot 2, frequency 5. Two slots indicated as random are slots which were assigned in the forward channel frame to each of the data stations as being available for data station packet transmission on a contention basis.

The control slots for carrying allocation requests for radio telephones having voice packets to transmit occupying slot 1, frequency 1, slot 2, frequency 2, slot 3, frequency 3, slot 4, frequency 4, slot 5, frequency 5, and slot 6, frequency 6, indicate that two radio telephones, identified as V4 and V5, are issuing an allocate request to the base station. Slots 2, frequency 1 and slot 6, frequency 4 indicate that the subslots for these time slots contain a token issued by data station 2 and data station 6 identified as D4 and D6, respectively constituting an allocation request to the base station for an assignment of a time slot for each of these data stations.

The next succeeding reverse channel data frame is shown in FIG. 9. The data frame indicates that the voice station 5 and voice station 4 were assigned time slots corresponding to slot 3, frequency 1, and slot 3, frequency 4. Data station 2 and data station 6 were assigned time slots corresponding to slot 4, frequency 3 and slot 3, frequency 6. Further, the slots which are marked random have changed in this succeeding reverse data frame as a result of an assignment given in the preceding forward channel frame (not shown).

The random slots now occupy slot 5, frequency 2, and slot 4, frequency 6. The data station, indicated as D5, is attempting to use slot 5, frequency 2. As no other stations are contending for this time slot, the packet inserted by data station 5 will, in all probability, be received by the base station.

If data station 5 has more than one packet to send, it appends an allocation request to the data packet and inserts the same in time slot 5, frequency 2. Thus, the base station will not only receive the first packet in the data que of data station 5, but will receive an allocation request and in the subsequent forward channel frame, assign a time slot, preferably the same time slot 5 of frequency 2 to the mobile station to complete transfer of the contents of its data station buffer.

The second of the random slots is shown as time slot 4 of frequency 6. In this scenario, two data stations D3 and D9, are contending for access to the second random slot. As two stations are attempting to insert a data packet in the single time slot, a collision occurs and the base station will not detect a data packet from either station. The frame of FIG. 9 also contains a data packet inserted in time slot 2 of frequency 5, which was assigned as a result of the allocation request issued in the frame of FIG. 8. The voice station 2 is shown as deallocated in FIG. 9, since a deallocation packet was appended to the packet transmitted in the previous frame, slot 4, frequency 2.

FIG. 10 illustrates the subsequent reverse data frame. In this frame, the data station control subslots C1, C2, C3 and C4 and C5, C6, C7 and C8 reappear in slots 2, frequency 1 and slot 6, frequency 4. The random slots for random access by the data stations are reassigned to slot 2, frequency 4, and slot 6, frequency 2. A further random slot is shown, assigned to slot 4, frequency 6. Data station 5 has retained the slot which it successfully contended for on a random basis, while data station 3, may request the allocation of a channel in this frame by adding an allocate request in subslot C3. As the colliding station D9 does not have a control subslot in the frame of FIG. 10, it must wait for a subsequent reverse frame having its assigned subslot if it is to use the round robin technique for obtaining an allocation request.

The foregoing frame scenario illustrates how data stations and voice stations contend for access to the reverse channel.

As can be seen from the three reverse channel data frames, 8, 9 and 10, each frame carries only eight subslots, enough to service eight data stations at a time. If more than eight data stations are in the system, there will be a one frame wait incurred until a subslot assigned to a particular data station is being received.

It is clear that if more than two slots in a frame are allocated for control purposes, more subslots will be available, thus reducing the wait. This option is within the judgment of the system designer.

Figure 11:
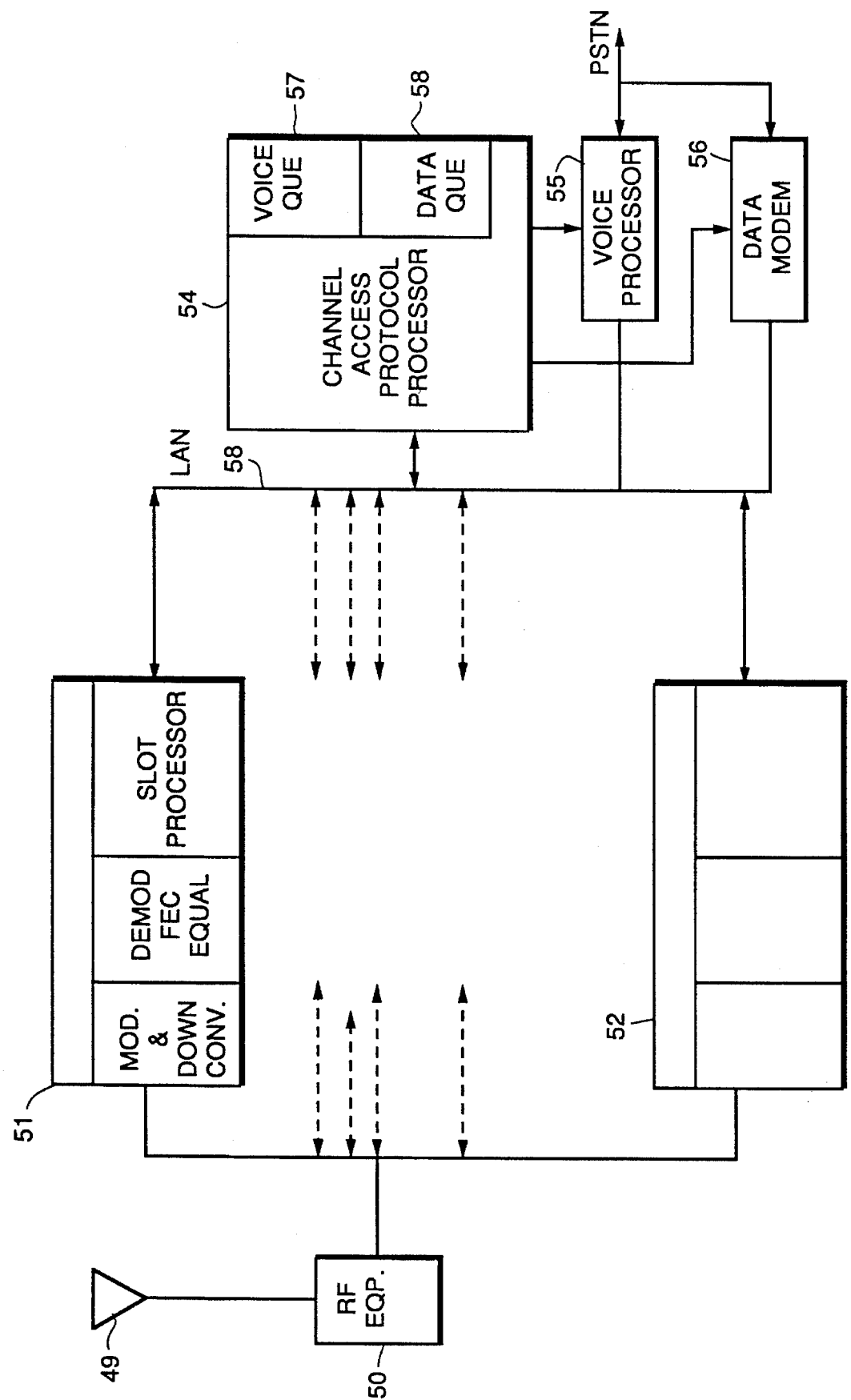
FIG. 11 is a block diagram of the base station architecture for affecting channel assignment in accordance with a preferred embodiment.

FIG. 11 is an illustration of a base station which is capable of accommodating both E-TDMA voice channel bandwidth management, as well as the foregoing data station bandwidth management for both the forward and reverse channel data frames. An antenna 49 provides both the transmitted forward control frame of each of six frequencies, as well as provides for reception of six additional frequencies, each bearing the time slots comprising the reverse channel data frame. The RF equipment 50 provides the necessary amplification and demultiplexing of each of the plurality of frequencies used in the forward and reverse data frames.

The reverse data frame frequency signals are received in six signal processors, two of which are shown as 51 and 52. The signal processors 51 and 52 each includes a down converter for demodulating a received carrier frequency, and a baseband demodulator with FEC error correction capability. The error corrected baseband signal is applied to a slot processor, which will remove packets of data contained in each slot carried on a carrier or subcarrier.

Each of the signal processing units 51, 52 is bidirectional. Data which is to be inserted in the forward control data frame is received in the slot processor, and modulated on a carrier frequency to be applied to the radio frequency equipment 50.

A channel access protocol processor 54 is shown which will provide the routing of individually-recovered data packets in the reverse data frame via the LAN 58 to either a voice processor 55 or data modem 56. The channel access protocol processor 54 does the assignment of the reverse channel data frame time slots and the forward channel data frame slots, based on the contents of the voice channel que and data channel que 58. It will also route the recovered data packets from the reverse data frame to either the voice processor 55 or data modem 56.

The data modem 56 may operate on the CGV 32 protocol to forward packets obtained from the reverse data frame over the PSTN 20 to the message center, where they may be routed to the appropriate party.

Thus, it can be seen that the foregoing system permits direct integration of a data station capability in a remote cellular telephone system, employing the E-TDMA format. It is possible to employ the protocol used in management of the reverse channel for other types of voice communication protocol, wherein assignments for channel space is controlled at the base station.

What is claimed is:

1. A method of implementing TDMA communications between a plurality of user radio telephone stations and a plurality of user data stations, and a base station, said method comprising the steps of:

establishing, at the base station, a pool of available traffic transmission channels, each traffic transmission channel comprising a time slot in a repeating time division multiple access (TDMA) frame at a predetermined carrier frequency;

establishing, at the base station, a control channel for the user radio telephone stations and a separate control channel for the user data stations, each control channel being comprised in at least one selected time slot in the TDMA frame, and at least one of a plurality of different frequencies;

responding at a user data station, to detection of a data packet to be transmitted, by transmitting a requesy for assignment of a traffic transmission channel on the control channel for data stations;

in response of receipt of the assignment request at the base station, searching for an available traffic transmission channel from the pool of available traffic transmission channels, said search resulting in the location of an available traffic transmission channel at the base station;

in response to location of an available traffic transmission channel at the base station, transmitting an identification of the located channel to the user data station and removing the located channel from the pool of available traffic channels;

receiving the transmitted located channel identification at the user data station;

in response of receipt of the channel identification at the user data station, initiating transmission of the data packet in the located and identified traffic transmission channel of the repeating time division multiple access frame;

receipt of a request from a user radio telephone station for assignment of a traffic transmission channel on the control channel for user radio telephone stations, in response thereto, also searching for an available traffic transmission channel from the pool of available traffic transmission channels, transmitting an identification of a located channel to the user radiotelephone station, and removing the located channel pool.

2. A method as recited in claim 1 comprising the further steps of:

responding, at the user data station, to detection of termination of the transmitted data packet at the user data station, by transmitting a request for release of the traffic transmission channel;

in response to receipt of the request for release at the base station, searching for identification of the traffic transmission channel assigned to the transmitting user data, and releasing that traffic transmission channel to the pool of available channels.

3. The method as recited in claim 2 wherein the step of transmitting a request for release comprises transmitting the request for release of the identified traffic transmission channel within the traffic transmission channel.

4. The method as recited in claim 1 further comprising the steps of:

detecting, at the base station, a data packet for transmission to a particular user data station;

searching for an available traffic transmission channel for transmission from the base station to the particular user data station said search resulting in the location of an available traffic transmission channel at the base station; and in response to locating an available traffic transmission channel from the search, transmitting an identification of the located traffic transmission channel to the particular user data station and initiating transmission of the data packet to the particular user data station using the located traffic transmission channel.

5. The method as recited in claim 4 further comprising the steps of:

detecting, at the base station, termination of the transmitted data packet;

searching for the traffic transmission channel previously assigned for transmission from the base station of the transmitted data packet said search resulting in the location of the previously assigned traffic transmission channel;

in response to locating the previously assigned traffic transmission channel, transmitting to the particular user data station notice of deallocation of the previously assigned traffic transmission channel and releasing the previously assigned channel to the pool.

6. The method as recited in claim 1, wherein the step of transmitting an assignment request comprises transmitting the request on at least two different carrier frequencies.

7. The method as recited in claim 1 wherein the step of transmitting an assignment request comprises transmitting the request on at least two different occasions in time.

8. The method as recited in claim 1 wherein the step of transmitting an assignment request comprises transmitting the request on at least two different power levels.

9. The method as recited in claim 1 wherein the step of transmitting an assignment request comprises transmitting the request on at least two different carrier frequencies, the transmission at a first carrier frequency having a power level different from the power level of the transmission on the second, different carrier frequency.

10. The method as recited in claim 1 further comprising the step of transmitting to a user data station a user station identification and identification of traffic and control channels by slot, subslot and frequency, in a control channel.

11. The method as recited in claim 1 wherein:

the step of transmitting a request for assignment of a traffic transmission channel is transmitted on a reverse control channel equivalent in time duration to one fourth of a reverse traffic transmission channel;

the step of transmitting an identification of the located channel is transmitted on a forward control channel equivalent in time duration to one half of a forward traffic transmission channel; and wherein the forward control channel has capacity for two different control messages.

12. In a radio telephony system having a plurality of data transmitting stations and a plurality of voice transmitting stations, each station transmitting information bursts to another station, the bursts containing either data for data stations or digitized voice for voice stations, the bursts being transmitted on radio carrier frequencies which are divided into repeating sequential time slots of a repeating time division multiple access (TDMA) frame, the time slots being associated with either a data control channel for carrying data station control messages, a voice control channel for carrying voice control messages or an information channel for carrying the information bursts, the data and voice control messages controlling the transmission of the data and voice information bursts between data and voice stations, respectively, a method for transmitting the information bursts from a transmitting station to a receiving station comprising:

detecting an information burst;

selecting a first slot associated with a control channel for transmitting a control message, the first slot being associated with a data control channel for data bursts and a voice control channel for a voice burst;

selecting a second slot associated with an information channel for transmitting the detected information burst;

transmitting the control message in the first selected slot for identifying the second selected slot; and transmitting the detected information burst in the second selected slot.

13. The method as recited in claim 12 wherein the first slot comprises a plurality of time division subslots, and wherein the step of selecting a first slot comprises selecting a subslot of a control channel slot, and wherein the step of transmitting a control message comprises transmitting the control message in the selected subslot.

14. The method as recited in claim 12 wherein the step of selecting a first slot comprises selecting a slot from among a plurality of data or voice control channels each control channel comprising an identified sequence of time slots, the data control channels being excluded from the voice control channels and all of the control channel time slots being excluded from the step of selecting a second slot.

15. The method as recited in claim 14 wherein each control channel is transmitted on a different carrier frequency.

16. The method as recited in claim 14 wherein the time slots of the information channel are all carried on the same carrier frequency.

17. The method as recited in claim 12 further comprising the steps of selecting a third slot for transmission of the control message and transmitting the control message in the third slot as well as in the first slot.

18. The method as recited in claim 17 wherein the steps of selecting a first and a third slot comprise selecting slots from among a plurality of control channels each control channel comprising a predetermined sequence of time slots, the first and third slots being selected from different control channels.

19. The method as recited in claim 12 wherein the step of identifying a second slot further comprises identifying an information channel for transmission of information bursts, the information channel comprising a predetermined repeating sequence of time slots of the TDMA frame.

20. The method as recited in claim 19 wherein the information burst comprises more information than can be transmitted in a single slot and wherein the step of transmitting the information burst further comprises transmitting the information burst in as many slots of the identified information channel as are desired to transmit the entire information burst.

21. In a radion data communications system having a base station and a plurality of user data stations, each user data station transmitting and receiving information bursts to and from the base station, the bursts being transmitted on radio carrier frequencies divided into time slots of a repeating time division multiple access (TDMA) frame, the slots being grouped into information channels for carrying information bursts, random access channels for carrying information bursts, and control channels for carrying control messages for controlling the transmission of the information bursts between stations, a method for transmitting the information bursts from a user station to the base station comprising:

receiving from the base station at the user data station an identification of each channel within a predetermined set of channels for use in transmitting data between the stations including an assignment of a specific control channel slot from among the control channel slots;

detecting at the user data station an information burst;

determining the time delay between the detection of the information burst and the next occurrence of the assigned control channel slot;

determining the time delay between the detection of the information burst and the next occurrence of a random access channel;

selecting the shortest time delay and transmitting from the user data station to the base station either an information channel allocation request using the assigned control channel slot or the information burst using the next random access channel.

22. The method of claim 21 wherein the control channel slots are divided into subslots and wherein the step of receiving an assignment of a specific control slot comprises the step of receiving an assignment of a specific subslot with the assigned control channel slot.

23. The method of claim 22 wherein each control channel subslot is assigned to a different data user station.

24. The method of claim 23 wherein the step of assigning a control channel subslot comprises assigning a control channel frame number in the sequence of repeating TDMA frames so that the control channel subslot assigned to a particular user data station recurs only in specified ones of the repeating TDMA frames.

* * * * *